US011283187B2

(12) United States Patent
Goldsmith et al.

(10) Patent No.: US 11,283,187 B2
(45) Date of Patent: Mar. 22, 2022

(54) DOUBLE REFLECTOR ANTENNA FOR MINIATURIZED SATELLITES

(71) Applicants: CALIFORNIA INSTITUTE OF TECHNOLOGY, Pasadena, CA (US); UNIVERSITY OF MIAMI, Miami, FL (US)

(72) Inventors: Paul F. Goldsmith, Pasadena, CA (US); Lorene A. Samoska, Pasadena, CA (US); Maria Alonso Del Pino, Pasadena, CA (US); Joshua O. Gundersen, Miami, FL (US); Pekka Kangaslahti, Pasadena, CA (US)

(73) Assignees: CALIFORNIA INSTITUTE OF TECHNOLOGY, Pasadena, CA (US); UNIVERSITY OF MIAMI, Miami, FL (US)

(*) Notice: Subject to any disclaimer, the term of this patent is extended or adjusted under 35 U.S.C. 154(b) by 213 days.

(21) Appl. No.: 16/750,663

(22) Filed: Jan. 23, 2020

(65) Prior Publication Data
US 2020/0266547 A1 Aug. 20, 2020

Related U.S. Application Data

(60) Provisional application No. 62/807,629, filed on Feb. 19, 2019.

(51) Int. Cl.
*H01Q 19/18* (2006.01)
*H04B 7/15* (2006.01)
(Continued)

(52) U.S. Cl.
CPC ............ *H01Q 19/19* (2013.01); *H01Q 1/288* (2013.01); *H04B 7/18576* (2013.01)

(58) Field of Classification Search
CPC .......... H01Q 1/28; H01Q 1/288; H01Q 13/00; H01Q 19/18; H01Q 19/19; H04B 7/15;
(Continued)

(56) References Cited

U.S. PATENT DOCUMENTS 7,124,903 B2 * 10/2006 Gruber ................. A47B 47/027
211/189
10,418,712 B1 * 9/2019 Henderson ........... H01Q 15/161
(Continued)

FOREIGN PATENT DOCUMENTS

WO   WO-2014019524 A1 * 2/2014 ............. H01Q 19/18

OTHER PUBLICATIONS

Samoska, L., et al., "Carbon Monoxide Surveyor using Monolithic Millimeter-wave Integrated Circuits (COSMMIC): A CubeSat Concept for a High Resolution All-Sky Survey of CO in the Milky Way," Abstract of Poster to appear in Proceedings of the 2019 American Astronomical Society Meeting, Seattle, WA.Jan. 2019. 2 Pages.
(Continued)

*Primary Examiner* — Blane J Jackson
(74) *Attorney, Agent, or Firm* — Steinfl + Bruno, LLP

(57) ABSTRACT

Double reflector electromagnetic systems implementable in miniaturized satellites and other applications for compact, light weight, and broadband antennas. The disclosed methods and devices include primary and secondary reflectors, where the secondary reflector is held in the aperture plane of the primary reflector to minimize required space. A specific Cassegrain configuration is also described.

16 Claims, 6 Drawing Sheets

(51) Int. Cl.
*H01Q 19/19* (2006.01)
*H01Q 1/28* (2006.01)
*H04B 7/185* (2006.01)

(58) Field of Classification Search
CPC . H04B 7/185; H04B 7/18506; H04B 7/18576
See application file for complete search history.

(56) References Cited

U.S. PATENT DOCUMENTS

| | | | |
|---|---|---|---|
| 2008/0204341 A1* | 8/2008 | Baldauf | H01Q 1/288 343/781 P |
| 2009/0184886 A1* | 7/2009 | Tuau | H01Q 19/193 343/914 |
| 2014/0368408 A1* | 12/2014 | Tuau | H01Q 19/134 343/914 |
| 2016/0352022 A1* | 12/2016 | Thomson | H01Q 1/288 |

OTHER PUBLICATIONS

Samoska, L., et al., "Miniature Packaging Concept for LNAs in the 200-300 GHz Range," 2016 IEEE MTT-S International Microwave Symposium (IMS), San Francisco, CA,2016. 4 Pages. Available online at <https://trs.jpl.nasa.gov/bitstream/handle/2014/45805/16-0804_A1b.pdf?sequence=1.

* cited by examiner

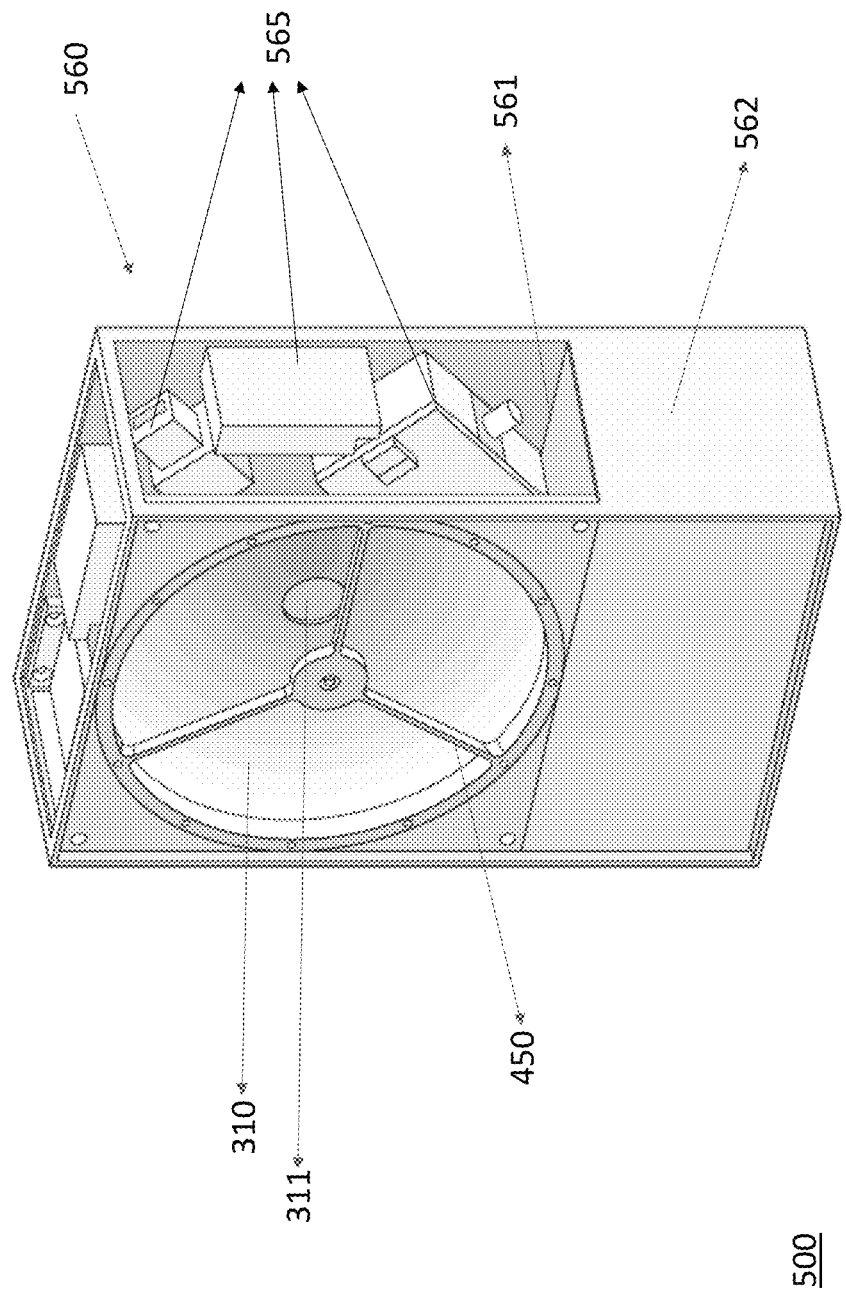

DOUBLE REFLECTOR ANTENNA FOR MINIATURIZED SATELLITES

CROSS-REFERENCE TO RELATED APPLICATIONS

The present application claims priority to U.S. provisional application No. 62/807,629 filed on Feb. 19, 2019, the contents of which are incorporated herein by reference in their entirety.

GOVERNMENT INTEREST

This invention was made with Government support under Grant No. 80NM0018D004 awarded by NASA (JPL). The Government has certain rights in the invention.

BACKGROUND

Field

The present disclosure is directed to electromagnetic wave reflecting systems, such as double reflector antennas and, more particularly, to double reflector antennas implementable in miniaturized satellites and other applications requiring compact, light weight, and broadband antennas.

Background

Reflector antennas use a metal surface to detect a plane wave (such as radiation from a distant source) and direct it to a feed, which collects the radiation and sends it to a receiver that processes the signal.

A reflector antenna can be provided with one, two, or more reflecting surfaces. An example of a single reflecting surface antenna is a prime focus reflector, which has a paraboloidal reflector that concentrates an incident plane wave and brings it to a focus at a point called the "prime focus". An example of a two-reflector antenna (i.e. an antenna with two reflecting surfaces) is the Cassegrain, which has a paraboloidal primary reflector, together with a hyperboloidal secondary reflector. The secondary reflector intercepts the radiation heading towards the prime focus, and redirects such radiation to a secondary focus. This is done for convenience since the prime focus is often located inconveniently far from the primary reflector (especially for large ground-based antennas). It can also be undesirable to have the feed and receiver at the prime focus for a small antenna in a spacecraft since that point may be outside the physical boundaries of the spacecraft.

The hyperboloidal Cassegrain secondary is located very close to the focal point. Once the parameters of the primary reflector and the desired properties of the secondary focus are selected, the form and location of the secondary reflector are determined Another type of two-reflector antenna system is the Gregorian, which uses an ellipsoidal secondary. The main disadvantage for applications being considered in the present disclosure is that the ellipsoidal secondary reflector is further away from the primary reflector than the prime focus. This means that the overall size of the system is larger than that of a Cassegrain system for the same performance.

SUMMARY

The electromagnetic systems, antennas, and related methods and devices disclosed herein address the technical challenges faced while designing such arrangements for applications wherein demanding requirements in terms of compactness, light weight and receiver performance are imposed. The disclosed arrangements are implementable in spacecraft such as miniaturized satellites deployed for space applications. A typical example of such satellites are the so-called "CubeSats".

According to a first aspect of the disclosure, an electromagnetic system configured for use in miniaturized satellites is provided, comprising: a primary reflector having a concave shape with an aperture plane and a symmetry axis perpendicular to the aperture plane; and a secondary reflector having a convex shape placed along the symmetry axis, either on the aperture plane or inside a volume defined by the aperture plane and the primary reflector, wherein the electromagnetic system is configured such that: incident electromagnetic waves are reflected by the primary reflector to generate primary reflected waves; and the primary reflected waves are then reflected by the secondary reflector, thereby generating secondary reflected waves focusing at a target point located behind the primary reflector.

According to a second aspect of the disclosure, a method of focusing electromagnetic waves to a target focal point in a spacecraft is disclosed, comprising: providing in the spacecraft a primary reflector having a concave shape with an aperture plane and a symmetry axis perpendicular to the aperture plane; arranging the primary reflector such that the target focal point is behind the primary reflector; placing in the spacecraft a secondary reflector having a convex shape along the symmetry axis, either on the aperture plane or inside a volume defined by the aperture plane and the primary reflector; and reflecting, through the primary reflector, electromagnetic waves toward the secondary reflector, thereby focusing the electromagnetic waves to the target focal point.

DESCRIPTION OF THE DRAWINGS

FIG. 5 shows an exemplary measurement system in accordance with an embodiment of the present disclosure.

DETAILED DESCRIPTION

Throughout the present disclosure reflector systems (e.g. antennas) with a primary reflector having a concave shape will be considered. The term "aperture plane" is referred to the plane defined by the rim of the reflector antenna. The term "symmetry axis" is referred to the axis orthogonal to the aperture plane and passing through a point on the reflector which is the farthest from the aperture plane. The term "behind the reflector" refers to the points that are outside the volume defined by the aperture plane and the reflector body, the points being closer to the reflector body than the aperture plane. The term "diameter" of a paraboloid is defined as the diameter of the circle defined by the rim of the paraboloid and the term "rim" is defined as the intersection of a plane perpendicular to the axis of symmetry of the paraboloid with the paraboloid. The term "focal ratio" of a paraboloid is defined as the ratio of the focal length to the diameter of the paraboloid.

Reflector antennas can work at almost any wavelength (any type of electromagnetic radiation) from radio waves to ultraviolet, as long as the surface is sufficiently accurate. A typical requirement is that the surface errors must be less than $1/16$ of a wavelength. This is easier to achieve at radio, microwave, and millimeter wavelengths, but more difficult at infrared and visible wavelengths. The result is that the longer wavelength (lower frequency) antennas can be made directly on a metal turning machine, which the short wavelength (high frequency) antennas have to be made of carefully polished glass. But the principle of operation is independent of the wavelength A given reflector antenna can generally operate over a very large range of frequencies (has a large bandwidth) as nothing really changes as long as the wavelength is much less than the surface errors. Thus, a single antenna can also operate at multiple frequencies simultaneously (differing by a factor of 2 or even a factor of 10). Other types of antennas such as planar antennas are generally very restricted in bandwidth and thus have to be designed for a specific frequency and often have problems meeting requirements on the exact frequency of operation and the bandwidth. As a consequence, reflector antenna systems (whether using a single or multiple reflectors) are very versatile and accommodate even significant changes in the desired frequency of operation without problems.

The main drawback of reflector antenna systems is their generally large volume, since the paraboloidal primary reflector and feed, or the primary and secondary reflector fill a three-dimensional volume. The exact size depends on the details of the design and, as described more in detail later, achieving a reduced and possibly minimum volume may be relevant for certain applications.

Figure 1A:
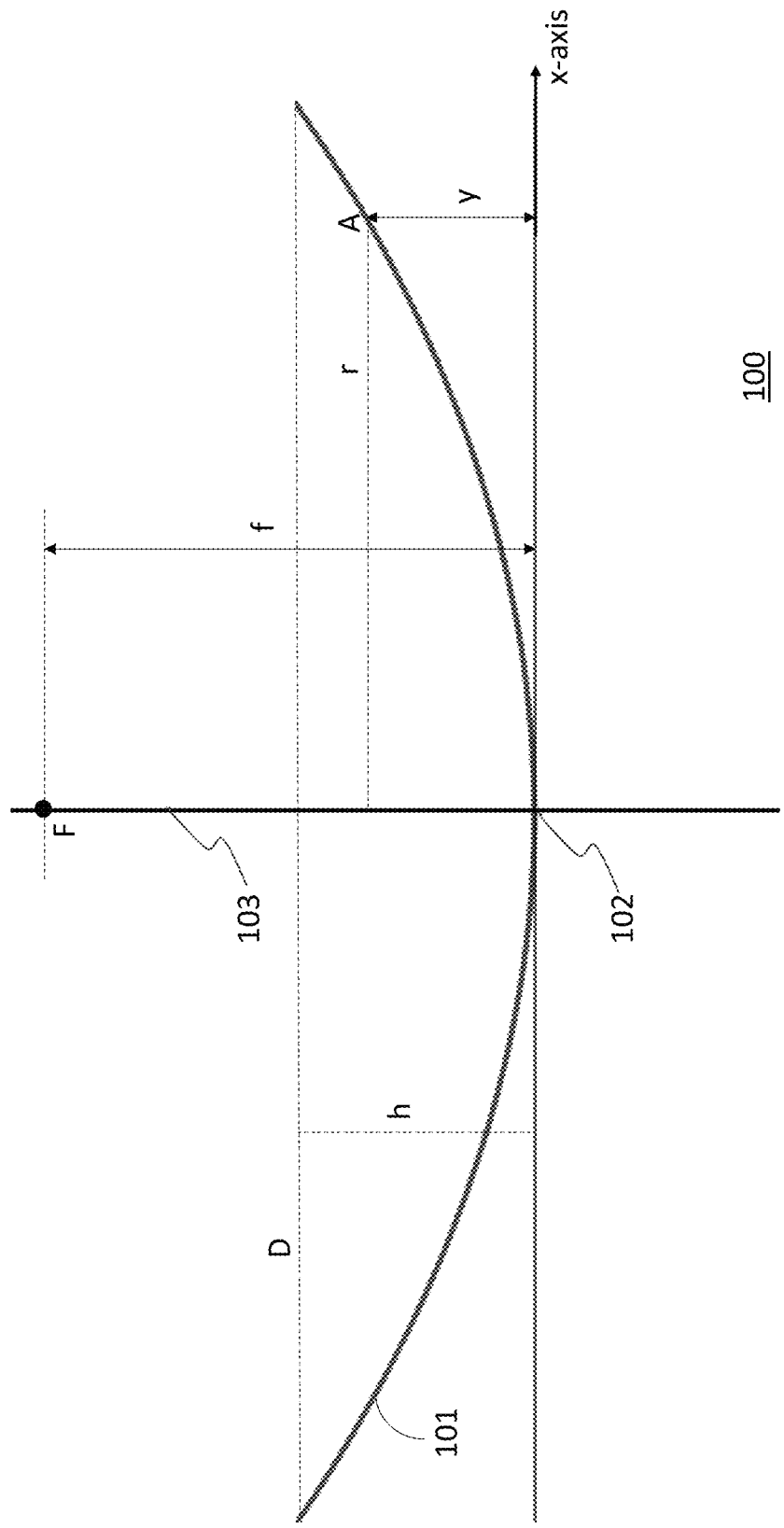
FIG. 1A shows a parabolic arrangements with its geometrical features highlighted.

FIG. 1A shows a cross section of a prior art reflector (100) with the shape of a pataboloid. Two-dimensional projected curve (101) is typically a parabola defined by the equation $$y = \frac{r^2}{4f},$$

wherein for each point A on the parabola, y represent the y-component of point A, i.e. the vertical distance from the vertex (102) of the parabola, and r is the distance from the axis of symmetry (103), defined by r=0.

The form of the three-dimensional paraboloid is such that plane parallel radiation incident along the axis of symmetry is brought to a focus at the focal point (F), which is located a distance y=f from the vertex (102).

With reference to FIG. 1A, the sensitivity of a parabolic antenna is proportional to its diameter (D). Thus, in comparing different antennas, it is often convenient to consider the diameter as fixed. One way to characterize different designs is by the focal ratio, which is equal to f/D. A parabola of diameter (D) and focal length (f), thus has a defined a focal ratio given by the preceding equation. The focal ratio is commonly used to define different antenna designs.

Figure 2:
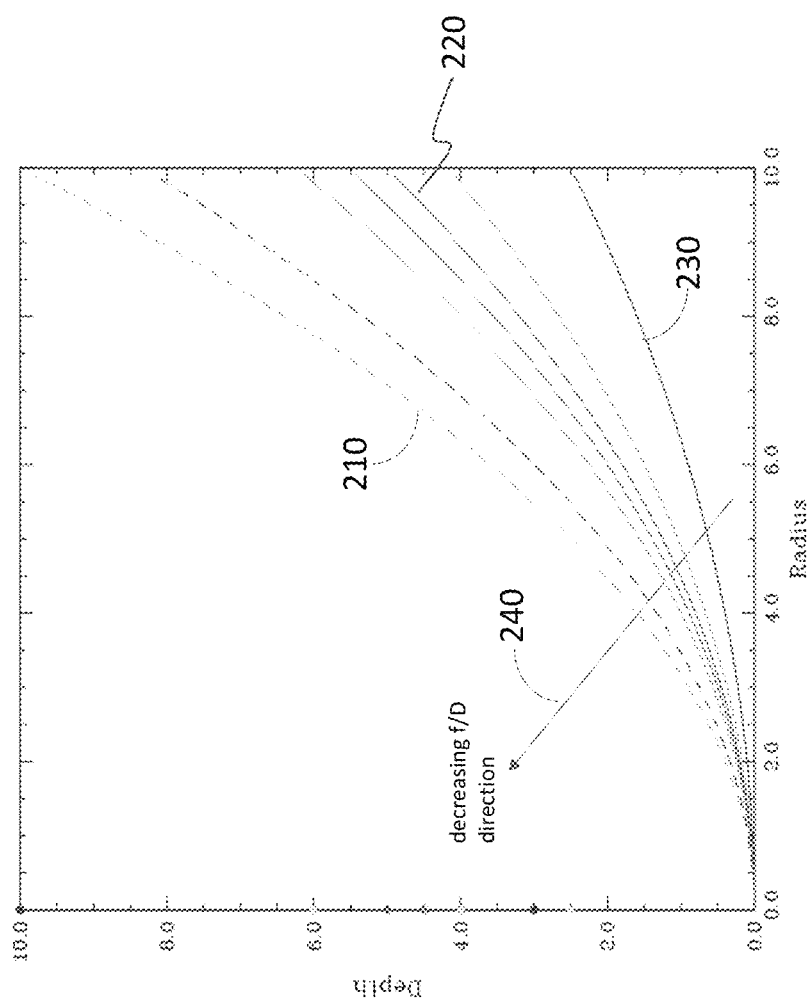
FIG. 2 shows exemplary graphs according to an embodiment of the present disclosure, depicting focal ratio and depth of a reflector antenna with a paraboloid shape.

The shapes of different parabolic reflectors having different focal ratios are illustrated in FIG. 2, wherein several curves representing variation of depth (D) vs. the radius of the parabola are shown. Each graph corresponds to a specific focal ratio and arrow (240) shows that the direction where the focal rations corresponding to the curves decreases. For example, curves (230, 220, 210) corresponds to focal ratios (0.5, 0.25, 0.125) respectively. All the curves correspond to an exemplary diameter D=20 cm.

Reflectors with small values of f/D are usually called "fast" and those with large values "slow." FIG. 2 shows that slow antennas with relatively large f/D have a relatively small depth (small value of Depth at radius=10 cm (the edge of the antenna)). However, these antennas have a focal point located far above the vertex, so that the overall depth of the system is large.

Figure 1B:
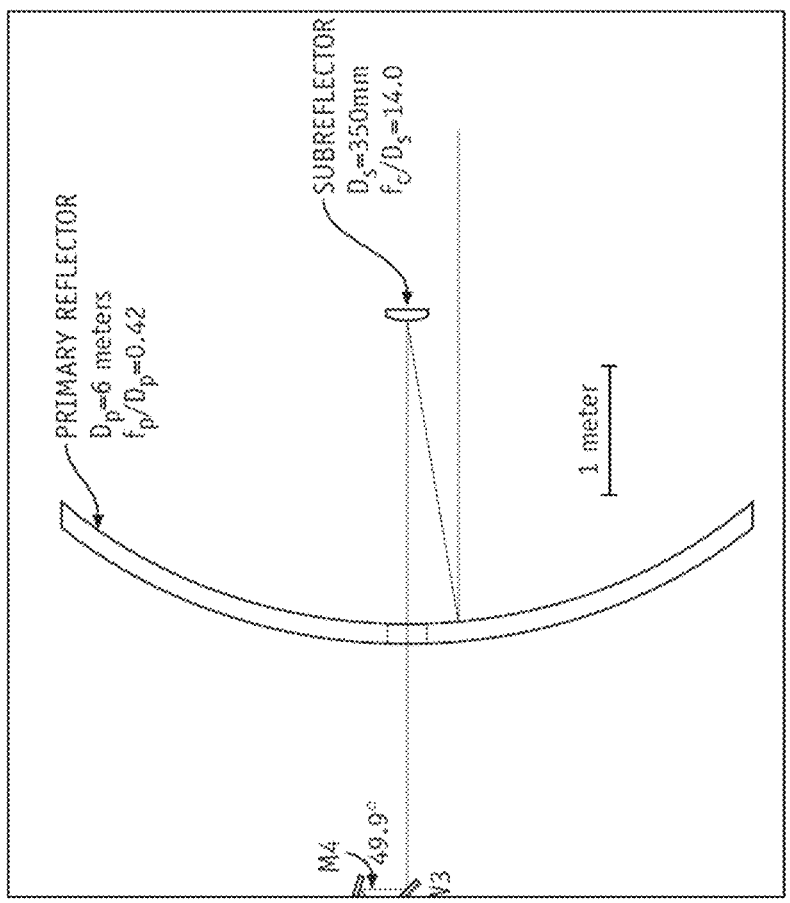
FIG. 1B shows a prior art antenna with primary and secondary reflectors.

To further clarify this issue, reference is made to FIG. 1B showing an example of antenna with primary and secondary reflectors, similar to a Cassegrain configuration. The primary reflector has a moderately large f/D ratio of about 0.5. The prime focus and the secondary reflector are located far above the primary reflector, with a resulting quite large overall size of the system. Preventing sunlight from reaching critical parts of the antennas represents a challenge, which is exacerbated by long support legs that hold the secondary reflector.

Referring back to FIG. 2, as the f/D ratio decreases, the edge depth increases, but the focal length is reduced and the prime focus point moves towards the reflector vertex. The overall system thus becomes more compact. For a focal ratio f/D=0.25, the focal length is 5 cm (since D=20 cm) and the focal point is at depth=5 cm. The edge of the antenna is also at depth=5 cm, so the focal point lies in the plane defined by the edge of the antenna (which is, as defined previously, a rim having the form of a circle for an antenna symmetric about the radius=0 axis, defining a plane). As f/D is decreased further, the edge depth increases, and is thus greater than 5 cm, and the focal point depth is less than the edge depth. The overall depth of the antenna is determined by the depth of its edge in this case as the focal point depth is less than the edge depth, meaning that in antennas with double reflectors, the secondary reflector and its support will not protrude the aperture plane of the primary reflector and as a result, the antenna will need an overall smaller space.

According to the teachings of the present disclosure, and based on the concepts disclosed above, the most compact antenna for a given diameter thus occurs for f/D=0.25. For a prime focus antenna, the feed and receiver would still have to be outside the plane defined by the rim of the antenna (i.e. continuing with the example of FIG. 2, y=5 cm). To fully exploit this design, a Cassegrain system is more beneficial and represents a preferred embodiment of the disclosure. Such system has a secondary reflector between the prime focus and the reflector vertex. A Gregorian system would have its ellipsoidal reflector at depth>5 cm, and would also be less compact, thus less preferred.

With further reference to FIG. 2, in antennas with f/D<0.25, the edge depth becomes increasingly large without any compensating advantage. A second issue for very small values of f/D is that the secondary reflector becomes more and more curved, and radiation that reflects from the edge of the secondary onto the primary does so almost at grazing incidence (meaning that the radiation comes in and exits almost parallel to the direction of the surface). This may lead to problems with efficiency and spurious polarization of the radiation. There is no absolute minimum value of f/D that is possible, but for f/D<0.15, the degradation of the antenna performance may become prohibitive.

In addition to larger volume and performance issues for very small values of f/D (i.e. less than 0.15), another issue is that it becomes more and more difficult to hold the secondary reflector. The accuracy with which the secondary has to be positioned becomes more and more demanding as f/D gets smaller. Thus, the secondary reflector has to be held with greater accuracy. Doing this for a secondary located at a depth smaller than the depth of the primary reflector is challenging, as supports from the rim become longer and longer, and thus less rigid. The shortest supports result from the secondary reflector being close to the plane defined by the rim of the primary reflector, which occurs for f/D=0.25.

The methods and devices described below adopt the above-mentioned concepts in accordance with the teachings of the present disclosure.

Figure 3:
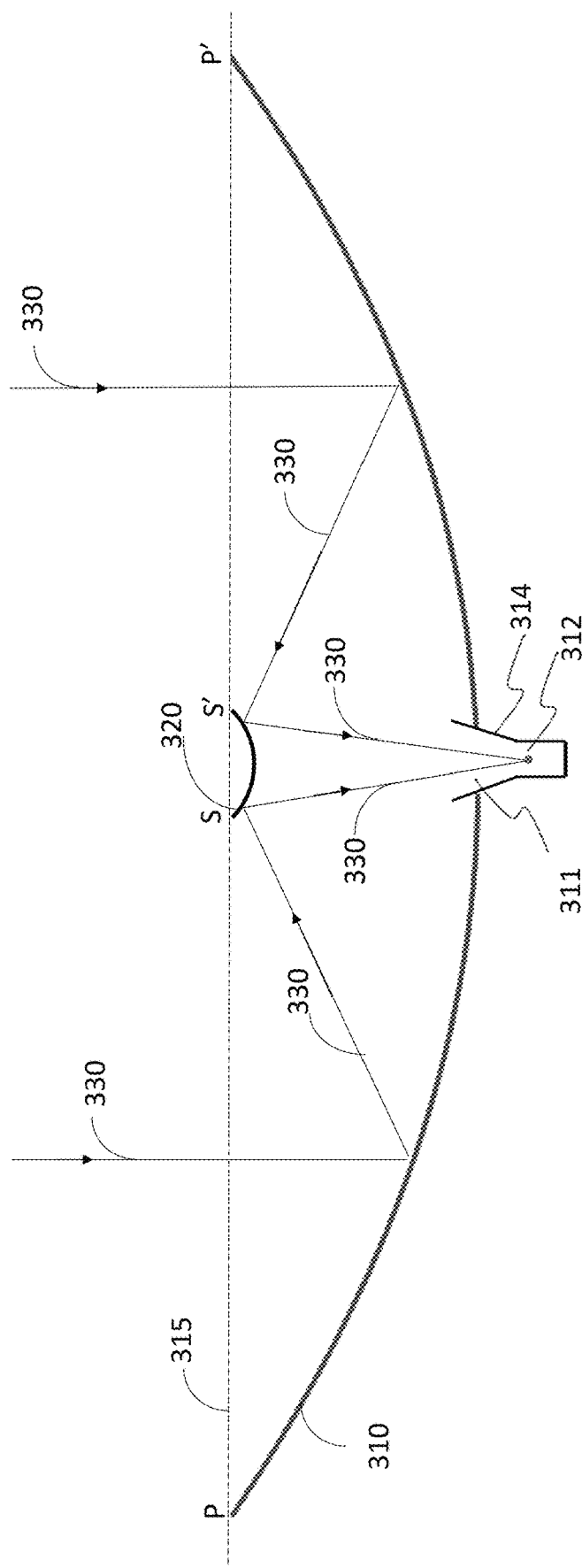
FIG. 3 shows an exemplary electromagnetic system in accordance with an embodiment of the present disclosure.

FIG. 3 shows a two-dimensional cross section of an exemplary electromagnetic system (300), e.g. an antenna, according to an embodiment of the present disclosure. The electromagnetic system (300) comprises a primary reflector (310) with a concave shape and a secondary reflector (320) with a convex shape. Some embodiments according to the present disclosure may include a hole (311) at a center of the primary reflector (310). During operating conditions, the electromagnetic system (300) collects an incident electromagnetic plane wave (330) coming from a distant source. The primary reflector (310) reflects the incident wave (330) toward the secondary reflector (320) which then reflects electromagnetic wave (330) back through the hole (310), via an optional feed horn (314), thereby focusing the electromagnetic wave (330) to a target focal point (312).

With reference to FIG. 3, and according to various embodiments of the present disclosure:
- the primary reflector (310) is symmetric and the secondary reflector (320) is placed on the intersection of the symmetry axis of the primary reflector (310) and the aperture plane of the primary reflector (310), such that the edges (P, P') of the primary reflector (310) and the edges (S, S') of the secondary reflector (320) are all on the same line;
- the primary reflector (310) is symmetric and the secondary reflector (320) is placed along the symmetry axis of the primary reflector (310) underneath the aperture plane such that the overall depth of the electromagnetic system (300) is defined by the edges (P, P');
- the primary reflector (310) has a paraboloid shape and the secondary reflector (320) has a hyperboloid shape, wherein the focal ratio f/D is within the range of 0.15 to 0.25, end values included; and
- the primary reflector (310) is adapted to operate with electromagnetic waves with wavelengths in the micrometer, sub-millimeter or millimeter ranges.

With further reference to FIG. 3, in the case where the electromagnetic system (300) is a Cassegrain system, i.e. the primary reflector (310) has a shape of a paraboloid and the secondary reflector (320) has a shape of hyperboloid, once the features of the primary reflector (310) are defined, the features of the secondary reflector (320) can be analytically calculated as described below:

1) The first parameter selected is the primary focal length, F1.
2) The second parameter selected is the primary diameter, D1, which is limited by the maximum dimension allowed by the CubeSat envelope, in the present case nominally 20 cm but slightly reduced by some practical considerations.

The equation for the primary reflector is $$y = r^2/4F1,$$

where y is the distance along the axis of symmetry, r is the radial distance from the axis of symmetry and F1 is the primary focal length.

3) For the case where the focal point of the parabola is to lie in its aperture plane, meaning in the plane defined by the circular rim of the reflector, then the edge of the primary must be defined by the point $y_e = F1$, and for this from the above, $r_e = 2F1$. The diameter D1 of the primary is $2r_e = 4F1$. The primary antenna focal ratio, given by F1/D1=0.25. Adopting this very "fast" primary with Primary Focal Ratio (PFR)=F1/D1=0.25 is a preferred aspect of the design for a compact antenna configuration for spacecraft applications.

4) The third parameter is the distance (called the back focal distance or BFD) behind the vertex of the primary reflector at which the secondary focus is located. This is where a feedhorn to collect the radiation and couple it into the receiver is located.

5) The primary focal length plus the back focal distance does not have to exceed the available dimension as imposed by the application. For example, this could be the dimension of a miniaturized satellite (e.g. a CubeSat) inside which the system is to be implemented.

6) The fourth parameter is the secondary focal ratio, SFR, which is related to the angular width of the radiation coming into the feed horn. The SFR determines the size of the feedhorn required to couple the receiver efficiently to the antenna system.

7) These four parameters define the location and shape of the secondary reflector of the system. The following expressions will provide a more detailed explanation of the relevant calculations.

The effective focal length of the system, F, is given by the secondary focal ratio of the Cassegrain system multiplied by the primary diameter, so $$F = SFR*D1.$$

The magnification M of the Cassegrain system is given by $$M = F/F1 = SFR/PFR.$$

The distance from the primary focal point to the secondary vertex, p, is given by $$p = (F1+BFD)/(M+1).$$

The diameter of the secondary reflector, D2, is given by $$D2 = D1*p/F1.$$

The distance from the secondary vertex to the secondary focal point, q, is given by $$q = F1+BFD-p.$$

Two quantities that define the shape of the secondary reflector are a and c, given by $$a = (q-p)/2 \text{ and } c = (q+p)/2.$$

The equation of the hyperbolic surface of the secondary reflector is $$y^2/a^2 - r^2/(c^2-a^2) = 1,$$

and the secondary extends from r=0 to r=D2/2.

8) The above quantities thus obtained allow determination of the shapes and locations of the two reflectors in a compact reflector system according to the teachings of the present disclosure. Using such quantities, an antenna can be fabricated to these specifications and meet the requirements imposed by a spacecraft use application.

Embodiments in accordance with the teachings of the disclosure may be implemented inside spacecraft with constraint space requirements (such as miniaturized satellites), e.g. for an all-sky survey instrument to study CO in the galaxy. An exemplary miniaturized satellite may have dimensions of about 10 cm×20 cm×20 cm. The person skilled in the art will appreciate that this is feasible by virtue of building an electromagnetic system in accordance with the teachings presented above, where careful consideration of placement of the primary and secondary reflectors without sacrificing performance has been described.

Figure 4:
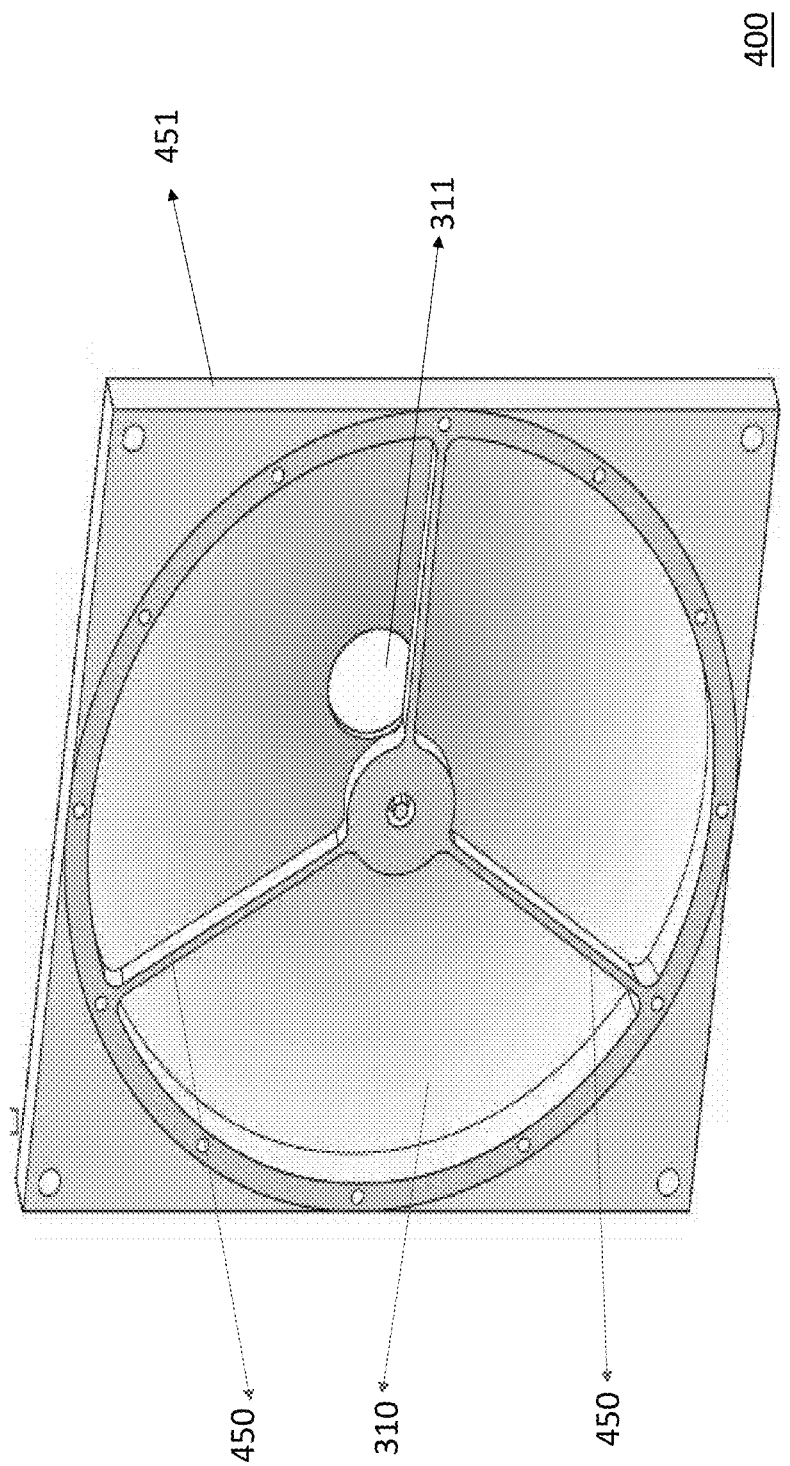
FIG. 4 shows an exemplary electromagnetic system in accordance with another embodiment of the present disclosure.

FIG. 4 shows a three-dimensional (3D) view of an electromagnetic system (400) built to be implemented in a miniaturized satellite. The primary reflector (310) along with the hole (311) as described previously in FIG. 3 is also shown. Struts (450), mounted on frame (451), may be used to hold the secondary reflector (not shown) in place with the required stability. According to embodiments of the present disclosure, the struts (450) may be placed in the same plane or a plane parallel to and slightly below the aperture plane of the primary reflector (310) such that the overall system can be contained within a miniaturized satellite. The struts (450) may be arranged in a flat or slightly angled position with respect to the aperture plane of the primary reflector (310).

FIG. 5 shows a measurement system (500) implementing the electromagnetic system (400) of FIG. 4 within a miniaturized satellite (560). The miniaturized satellite (560) comprises a first section (561) accommodating electronic devices (565), and a second section (562) containing various electronic modules (not shown) related to satellite avionics, power, and communication. The electronic devices (565) may include a low noise amplifier, mixer, local oscillators, processors and any other electronic circuits that may be implemented to receive and process the electromagnetic wave as focused at the target focal point (312) of FIG. 3. Referring back to an exemplary miniaturized satellite with dimensions of 10 cm×20 cm×20 cm, the primary reflector (310) may be built, for example, as an 18 cm reflector to make such implementation possible. The secondary reflector (320) may be kept in place with the required degree of stability using three or more struts.

The invention claimed is:

1. An electromagnetic system configured for use in miniaturized satellites, comprising:
   a primary reflector having a concave shape with an aperture plane and a symmetry axis perpendicular to the aperture plane; and
   a secondary reflector having a convex shape placed along the symmetry axis, either on the aperture plane or inside a volume defined by the aperture plane and the primary reflector,
   wherein the electromagnetic system is configured such that:
      incident electromagnetic waves are reflected by the primary reflector to generate primary reflected waves; and
      the primary reflected waves are then reflected by the secondary reflector, thereby generating secondary reflected waves focusing at a target point located behind the primary reflector,
      wherein the electromagnetic system is arranged in a Cassegrain configuration, wherein:
         the primary reflector has a paraboloid shape and the secondary reflector has a hyperboloid shape, and
         a focal ratio of the primary reflector is in a range from 0.15 to 0.25.

2. The electromagnetic system of claim 1, wherein the focal ratio of the primary reflector is 0.25.

3. The electromagnetic system of claim 1, wherein the primary reflector comprises a hole in a bottom region thereof.

4. The electromagnetic system of claim 1, further comprising a plurality of struts connected to the primary reflector to hold the secondary reflector in place.

5. The electromagnetic system of claim 4, wherein the plurality of struts are arranged in a same plane being the aperture plane or parallel to the aperture plane.

6. The electromagnetic system of claim 5, configured to operate with electromagnetic waves with wavelengths in micro-meter, sub-millimeter or millimeter ranges.

7. The electromagnetic system of claim 6, further comprising a feed horn arranged to collect the secondary reflected waves.

8. The electromagnetic system of claim 7, further comprising an electronic receiver to couple the secondary reflected waves.

9. A miniaturized satellite comprising the electromagnetic system of claim 8.

10. A method of focusing electromagnetic waves to a target focal point in a spacecraft, comprising:
    providing in the spacecraft a primary reflector having a concave shape with an aperture plane and a symmetry axis perpendicular to the aperture plane;
    arranging the primary reflector such that the target focal point is behind the primary reflector;
    placing in the spacecraft a secondary reflector having a convex shape along the symmetry axis, either on the aperture plane or inside a volume defined by the aperture plane and the primary reflector; and
    reflecting, through the primary reflector, electromagnetic waves toward the secondary reflector, thereby focusing the electromagnetic waves to the target focal point,
    wherein a focal ratio of the primary reflector is in a range from 0.15 to 0.25.

11. The method of claim 10, wherein the primary reflector in the spacecraft has a paraboloid shape and the secondary reflector in the spacecraft has a hyperboloid shape.

12. The method of claim 10, wherein the focal ratio of the primary reflector is 0.25.

13. The method of claim 10, further comprising connecting a plurality of struts to the primary reflector to hold the secondary reflector in place in the spacecraft.

14. The method of claim 13, wherein the plurality of struts are arranged in a same plane being the aperture plane or parallel to the aperture plane.

15. The method of claim 10, wherein the electromagnetic waves have wavelengths in micro-meter, sub-millimeter or millimeter ranges.

16. The method of claim 10, wherein the spacecraft is a miniaturized satellite.

* * * * *